US008427774B2

(12) United States Patent
Green et al.

(10) Patent No.: US 8,427,774 B2
(45) Date of Patent: *Apr. 23, 2013

(54) PASS-THROUGH MECHANISM FOR LINEAR TAPE LIBRARY

(75) Inventors: Andrew Stuart Green, Tucson, AZ (US); Frank Krick, Mainz (DE); Shawn Michael Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,425

(22) Filed: Jun. 20, 2012

(65) Prior Publication Data

US 2012/0259454 A1    Oct. 11, 2012

Related U.S. Application Data

(63) Continuation of application No. 13/401,588, filed on Feb. 21, 2012, which is a continuation of application No. 13/109,713, filed on May 17, 2011, now Pat. No. 8,139,314, which is a continuation of application No. 12/038,551, filed on Feb. 27, 2008, now Pat. No. 7,974,040.

(51) Int. Cl.
*G11B 15/68* (2006.01)

(52) U.S. Cl.
USPC ........................................ 360/92.1

(58) Field of Classification Search .......... None
See application file for complete search history.

(56) References Cited

U.S. PATENT DOCUMENTS

| 3,715,040 | A | 2/1973 | Polus et al. |
| 5,570,337 | A | 10/1996 | Dang |
| 6,094,322 | A | 7/2000 | Nakagomi et al. |
| 6,438,623 | B1 | 8/2002 | Ryan |
| 6,457,928 | B1 | 10/2002 | Ryan |
| 6,648,574 | B2 | 11/2003 | Williams |
| 6,904,005 | B2 | 6/2005 | Emberty |
| 7,021,883 | B1 | 4/2006 | Plutt et al. |
| 7,212,470 | B2 | 5/2007 | Dimitri et al. |
| 7,974,040 | B2 * | 7/2011 | Green et al. ............ 360/92.1 |
| 8,139,314 | B2 * | 3/2012 | Green et al. ............ 360/92.1 |
| 8,264,791 | B2 | 9/2012 | Green et al. |
| 2003/0123341 | A1 | 7/2003 | Ostwald et al. |
| 2004/0057346 | A1 | 3/2004 | Romig |
| 2012/0148379 | A1 | 6/2012 | Green et al. |

OTHER PUBLICATIONS

Notice of Allowance dated Feb. 22, 2011, pp. 1-10, for U.S. Appl. No. 12/038,551, filed Feb. 27, 2008 by inventors A.S. Green et al. (18.246).

(Continued)

*Primary Examiner* — Mark Blouin
(74) *Attorney, Agent, or Firm* — Rabindranath Dutta; Konrad Raynes Davda & Victor LLP

(57) ABSTRACT

A pass-through mechanism that couples a first linear tape library string to a second linear tape library string is maintained. A first robotic assembly associated with the first linear tape library string places a tape from the first linear tape library string into the pass-through mechanism. The pass-through mechanism moves the tape to a position where the tape can be removed by a second robotic assembly associated with the second linear tape library string. The second robotic assembly removes the tape from the pass-through mechanism and places the tape into the second linear tape library string.

20 Claims, 9 Drawing Sheets

OTHER PUBLICATIONS

Notice of Allowance dated Dec. 5, 2011, pp. 1-11, for U.S. Appl. No. 13/109,713, filed May 17, 2011 by inventors A.S. Green et al. (18.246C1).

Notice of Allowance dated May 12, 2012, pp. 1-11, for U.S. Appl. No. 13/401,588, filed Feb. 21, 2012 by inventors A.S. Green et al. (18.246C2).

US Patent Application Serial No. Unknown, filed Jun. 20, 2012, entitled "Pass-Through Mechanism for Linear Tape Library", by inventors A.S. Green, F. Krick, S.M. Nave and R. Yardy, (18.246C3).

US Patent Application Serial No. Unknown, filed Jun. 20, 2012, entitled "Pass-Through Mechanism for Linear Tape Library", by inventors A.S. Green, F. Krick, S.M. Nave and R. Yardy, (18.246C5).

Office Action dated Aug. 27, 2012, pp. 1-11, for U.S. Appl. No. 13/528,413, filed Jun. 20, 2012, by inventors A.S. Green, F. Krick, S.M. Nave and R. Yardy, (18.246C3).

Response dated Nov. 27, 2012, pp. 1-2, to Office Action dated Aug. 27, 2012, pp. 1-11, for U.S. Appl. No. 13/528,413, filed Jun. 20, 2012, by inventors A.S. Green, F. Krick, S.M. Nave and R. Yardy, (18.246C3).

Office Action dated Aug. 30, 2012, pp. 1-11, for U.S. Appl. No. 13/528,461, filed Jun. 20, 2012, by inventors A.S. Green, F. Krick, S.M. Nave and R. Yardy, (18.246C5).

Response dated Nov. 27, 2012, pp. 1-2, to Office Action dated Aug. 30, 2012, pp. 1-11, for U.S. Appl. No. 13/528,461, filed Jun. 20, 2012, by inventors A.S. Green, F. Krick, S.M. Nave and R. Yardy, (18.246C5).

Notice of Allowance dated Dec. 11, 2012, pp. 1-11, for U.S. Appl. No. 13/528,413, filed Jun. 20, 2012.

Notice of Allowance dated Dec. 11, 2012, pp. 1-11, for U.S. Appl. No. 13/528,461, filed Jun. 20, 2012.

* cited by examiner

PASS-THROUGH MECHANISM FOR LINEAR TAPE LIBRARY

CROSS-REFERENCE TO RELATED APPLICATIONS

This application is a continuation of application Ser. No. 13/401,588 filed on Feb. 21, 2012, which is incorporated herein by reference in its entirety. Application Ser. No. 13/401,588 is a continuation of application Ser. No. 13/109,713 filed on May 17, 2011, and issued as U.S. Pat. No. 8,139,314 which is incorporated herein by reference in its entirety. Application Ser. No. 13/109,713 is a continuation of application Ser. No. 12/038,551 filed on Feb. 27, 2008 and issued as U.S. Pat. No. 7,974,040, which is incorporated herein by reference in its entirety.

BACKGROUND

1. Field

The disclosure relates to a method, system, and article of manufacture for a pass-through mechanism for a linear tape library.

2. Background

Many customers may desire a very large single-image automated tape library. Certain customers may require very large automated tape library systems that include tens of thousands or more of tape cartridges. Many of these customers may require that these large tape library systems be connected such that any particular tape in the library system can be moved to any drive in the library system. Since a tape library has a finite capacity for tapes, if the overall capacity requirements of a customer exceeds the finite capacity of the tape library, a plurality of tape libraries may have to be connected together in order to meet the capacity requirements of the customer.

One method of creating large tape libraries is to generate long library strings, or linear libraries, where the library frames are added side by side and an accessor can travel between the library frames to move cartridges from storage shelves to tape drives.

SUMMARY OF THE DESCRIBED EMBODIMENTS

Provided are a method, system, and article of manufacture in which a pass-through mechanism that couples a first linear tape library string to a second linear tape library string is maintained. A first robotic assembly associated with the first linear tape library string places a tape from the first linear tape library string into the pass-through mechanism. The pass-through mechanism moves the tape to a position where the tape can be removed by a second robotic assembly associated with the second linear tape library string. The second robotic assembly removes the tape from the pass-through mechanism and places the tape into the second linear tape library string.

In further embodiments, a sum of lengths of the first linear tape library string and the second linear tape library string is such that a single linear tape library string whose length is at least equal to the sum cannot be accommodated in a room in which the first and the second linear tape library strings are placed.

In additional embodiments, the first linear tape library string and the second linear tape library string are included in a plurality of tape library strings that are coupled by one or more pass-through mechanisms. In further embodiments, a linear tape library string of the plurality of tape library strings includes a plurality of tape library frames, wherein a plurality of tapes can be stored in a tape library frame, wherein the tape that is moved by the pass-through mechanism is initially in a first tape library frame included in the first linear tape library string and is placed by the first robotic assembly from the first tape library frame to a cell carrier on the pass-through mechanism, and wherein the tape is placed by the second robotic assembly in a second tape library frame included in the second linear tape library string.

In yet additional embodiments, the pass-through mechanism includes a cell carrier for moving the tape over one or more rail segments from the first linear tape library to the second linear tape library.

In further embodiments, the first and the second tape library strings are included in a plurality of tape library strings that are coupled by a plurality of pass-through mechanisms, wherein a selected tape cartridge can be moved from one tape library string to another over a plurality of paths by using one or more of the plurality of pass-through mechanisms, and wherein a linear tape library is a tape library in which a robotic accessor path for accessing a tape cartridge is a straight line.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Pass-Through Mechanism for a Linear Tape Library

A problem that exists with linear libraries is that when customers want a very large capacity for tapes, the library string gets very long, i.e., the length of the library string may approach or exceed the length of a room in which the library string is to be kept. For example, an upper limit of frames in an exemplary library may be 16 frames, which may be about 40 feet long. Although customers may want more cartridges than are provided in 16 frames, they may not have the floor space for a library string of greater than 40 feet in any one direction in a room.

Certain existing tape libraries connect library frames with pass-through mechanisms, without using linear libraries. The pass-through mechanisms in such libraries pass tape cartridges from one adjacent frame to the other. When more than two libraries are connected, in order to move a tape cartridge from one end of a library configuration to the other end, each robotic accessor may pass the tape cartridge to the next library frame. The multiple transfer of tape cartridges from accessor to accessor can greatly increase the latency experienced while attempting to mount a tape cartridge in a drive that is at the other end of a library string.

Certain embodiments provide an overhead pass-through mechanism that links together a plurality of linear library strings to create a very large automated tape library. Certain embodiments may be implemented in association with existing automated tape library strings. The use of an over-head pass-through mechanism allows for the service clearance required by existing library strings. Also, in certain embodiments the pass-through mechanisms do not require the accessor to accessor hand-off required by existing pass-through mechanisms. Certain embodiments allow for cartridges to move from any library string to any other library string without interfering with the robotic actions of any library strings that are located in between.

Exemplary Embodiments

Figure 1:
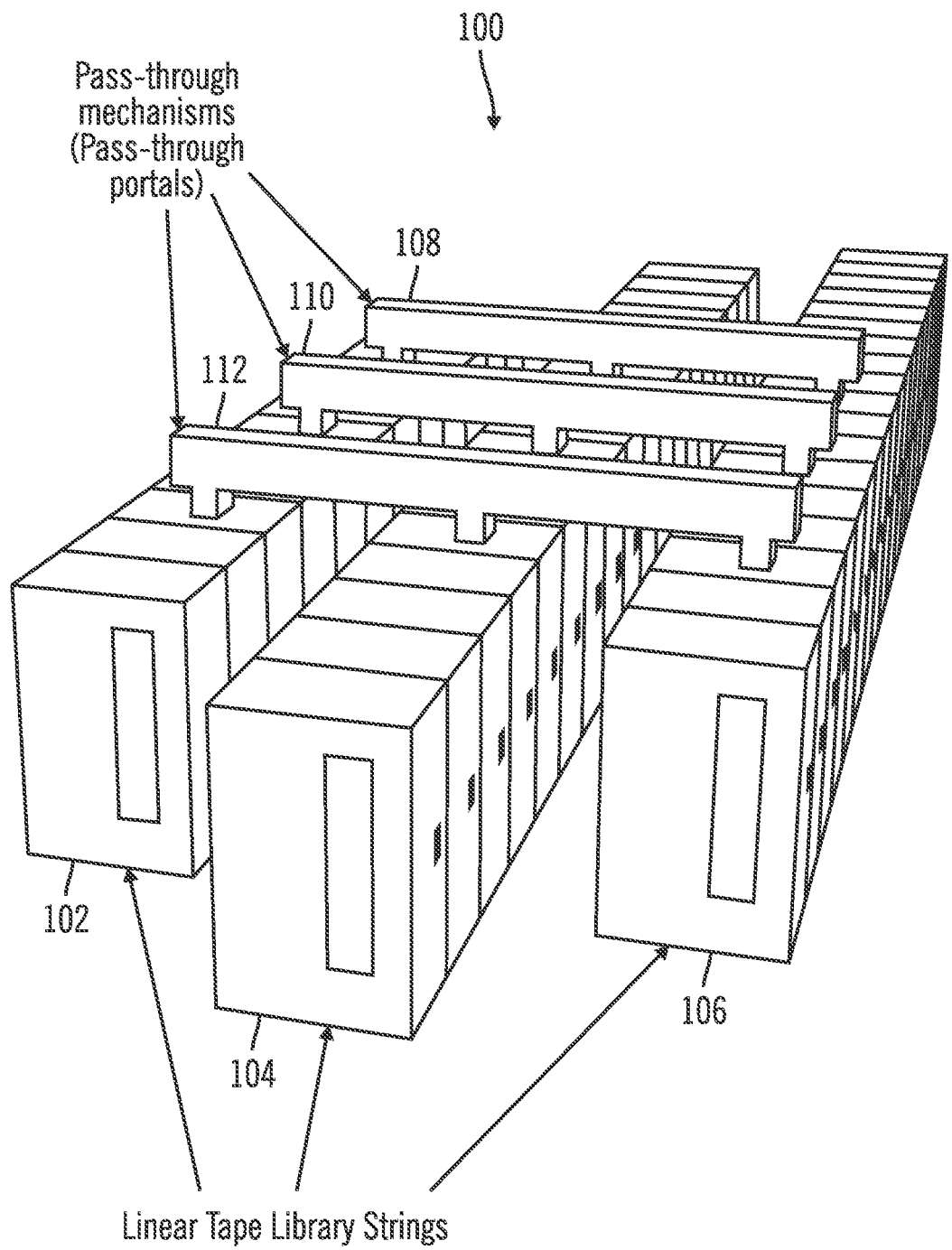
FIG. 1 illustrates a diagram that shows a three-dimensional view of a pass-through mechanism for linear libraries, in accordance with certain embodiments.

FIG. 1 illustrates a diagram 100 that shows a three-dimensional view of a plurality of pass-through mechanisms for linear tape library strings, in accordance with certain embodiments.

In FIG. 1, three exemplary linear tape library strings 102, 104, 106 are coupled via three exemplary pass-through mechanisms 108, 110, 112. While three exemplary linear tape library strings and three exemplary pass-through mechanisms are shown in FIG. 1, in alternative embodiments fewer or greater number of linear tape library strings and pass-through mechanisms may be present. For example, in certain embodiments, ten linear tape library strings may be coupled via two pass-through mechanisms.

As shown in FIG. 1, the pass through mechanisms 108, 110, 112 are in an overhead position over the linear tape library strings 102, 104, 106. For example, the linear tape library strings 102, 104, 106 may be placed on a floor of a room, and the pass through mechanisms may be placed between the ceiling of the room and the top of the linear tape library strings 102, 104, and 106 while still allowing walking access to operator or service personnel underneath the pass through mechanisms 108, 110, 112.

In certain alternative embodiments the pass-through mechanisms 108, 110, 112 can be configured to be below the linear tape library strings 102, 104, and 106. For example, the linear tape library strings 102, 104, 106 may be on raised platforms on the floor of a room, and the pass through mechanisms may 106, 108, 110 may be placed below the raised platforms.

Figure 2:
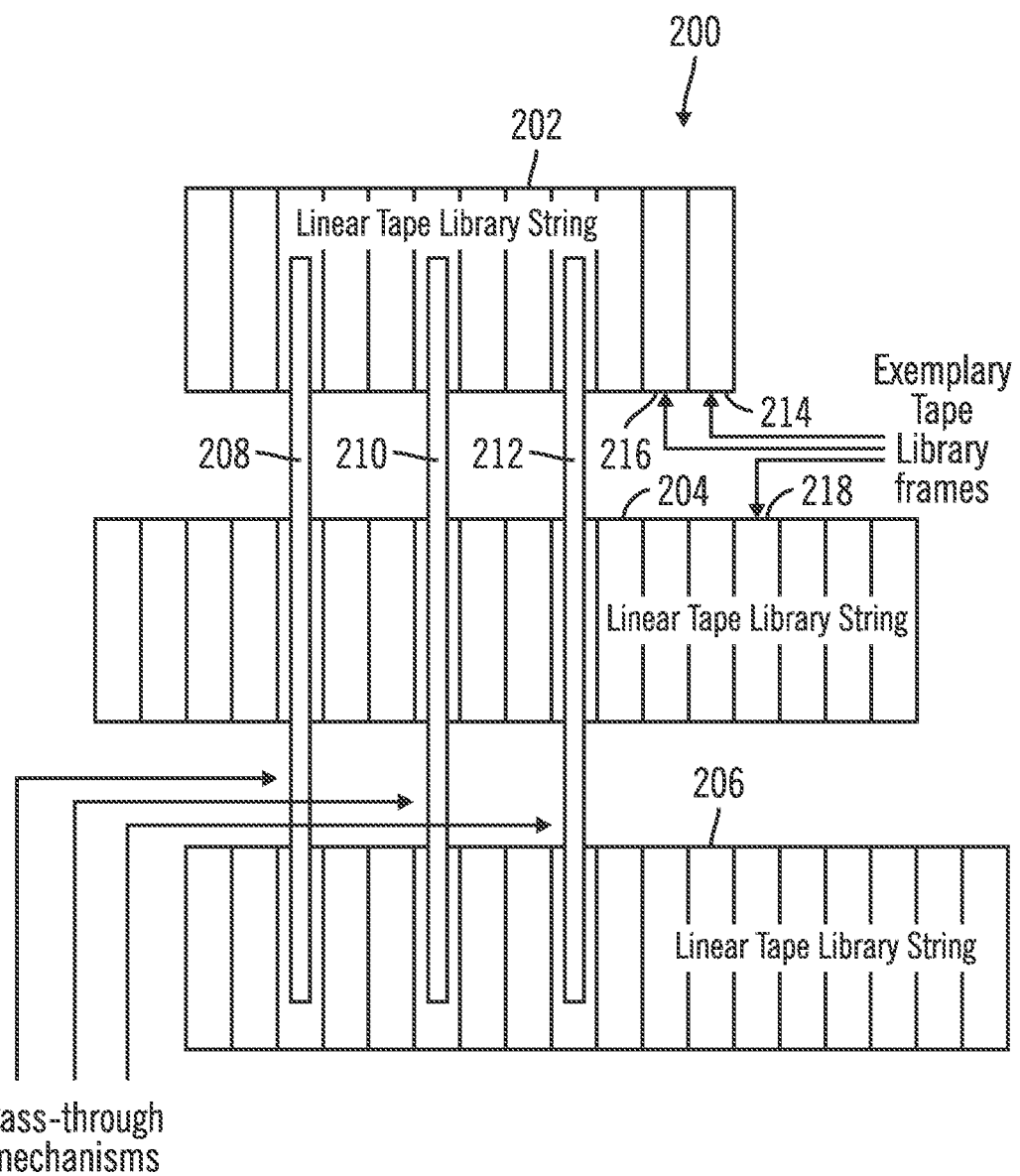
FIG. 2 illustrates a diagram that shows a top-view of a pass-through enabled library, in accordance with certain embodiments.

FIG. 2 illustrates a diagram 200 that shows a top-view of a pass-through enabled library, in accordance with certain embodiments. Three exemplary linear tape library strings 202, 204, 206 are coupled via three exemplary pass through mechanisms 208, 210, 212.

FIG. 2 shows that a linear tape library string of the plurality of tape library strings includes a plurality of tape library frames. For example, three exemplary tape library frames 214, 216, 218 are shown, wherein tape library frames 214, 216 are included in linear tape library string 202, and tape library frame 218 is included in linear tape library string 204.

A plurality of tapes can be stored in a tape library frame. In an exemplary embodiment, a tape that is initially in a tape library frame of a first linear tape library string may be placed by a robotic assembly on a pass-through mechanism. The pass-through mechanism can then move the tape via a rail to a position that is proximate to (i.e., close to and includes adherence) a second linear tape library string, wherein a robotic assembly associated with the second linear tape library string may pick up the tape from the pass-through mechanism and place the tape in a tape library frame of the second linear tape library. In certain alternative embodiments, the proximity of the tape that is moved to the second linear tape library string is such that the tape that is moved and the second linear tape library string adhere to (i.e., fits into or touch) each other.

Figure 3:
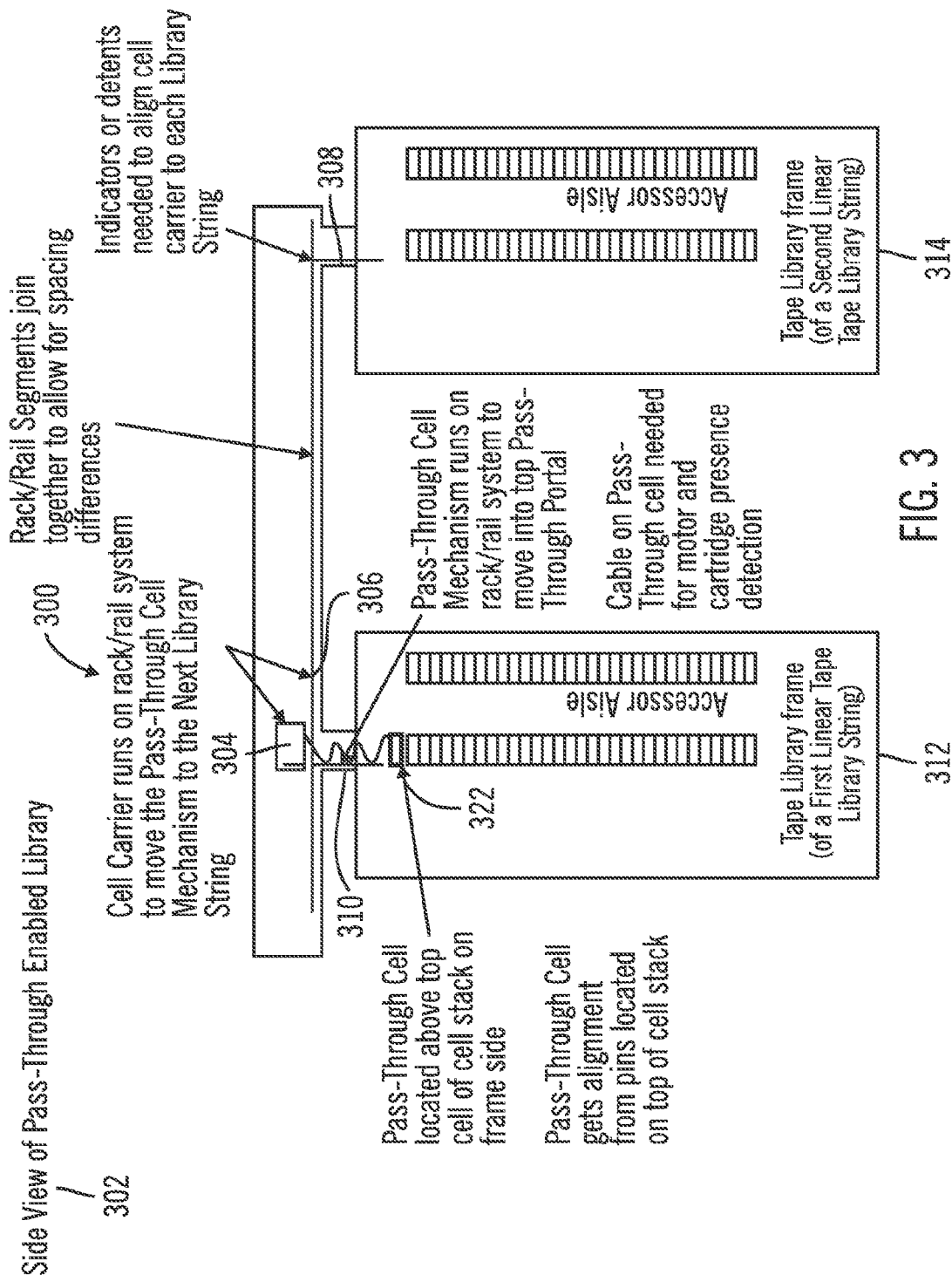
FIG. 3 illustrates a diagram that shows how rack/rail systems are used in association with the pass-through mechanism, in accordance with certain embodiments.

FIG. 3 illustrates a diagram 300 that shows how rack/rail systems are used in association with the pass-through mechanism, in accordance with certain embodiments. FIG. 3 shows the side view 302 of a pass-through enabled library.

In FIG. 3, a cell carrier 304 runs on rack/rail system 306, 308, 310 to move a tape cartridge placed in the cell carrier 304 from the tape library frame 312 of a first linear tape library string to another tape library frame 314 of a second linear tape library string. The pass-through cell 322 is located above the top cell of the cell stack on the frame side, and the pass-through cell 322 secures alignment from pins located on top of cell stack. While various mechanisms are described in the illustration of FIG. 3, the net effect is that a first robotic assembly places a tape from the tape library frame 312 of the first linear tape library string into the pass-through cell 322. The pass-through cell 322 then moves up the rack rail system 310 moving into the cell carrier 304, and the cell carrier 304 moves the tape to a position proximate (i.e., close to) to the tape library frame 314 of the second linear tape library string via at least one rack/rail system 306. The pass-through cell 322 then moves down the rack rail system 308 into the tape library frame 314. A second robotic assembly picks up the tape from the pass-through cell 322 and places the tape into the tape library frame 314 of the second linear tape library.

Figure 4:
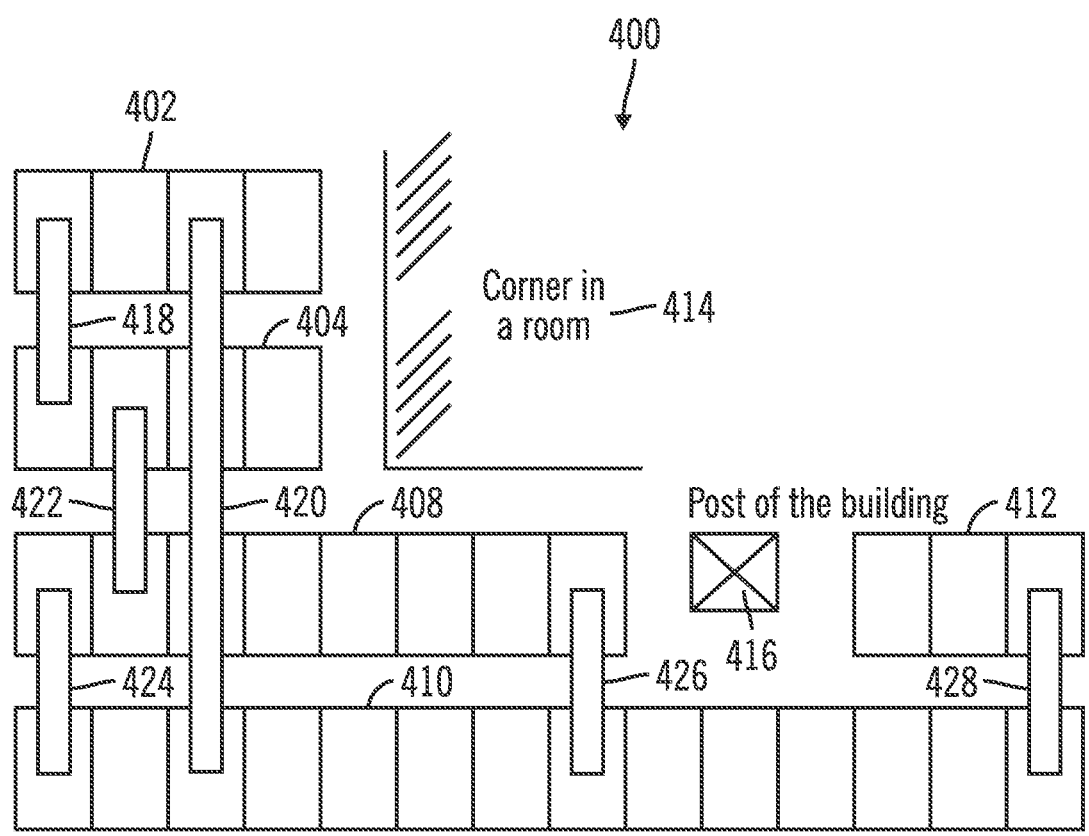
FIG. 4 illustrates a diagram in which multiple possible paths exist for moving a tape cartridge from one frame to another, in accordance with certain embodiments.

FIG. 4 illustrates a diagram 400 in which multiple possible paths exist for moving a tape cartridge from one tape library frame to another, in accordance with certain embodiments.

In FIG. 4, five linear tape library strings 402, 404, 408, 410, 412 are shown. The exemplary layout of the five linear tape library strings 402, 404, 408, 410, 412 may have been chosen by a user because of the location of the corner 414 of the room and/or the post 416 of the building. The five linear tape library strings 402, 404, 408, 410, 412 are coupled via the pass-through mechanisms 418, 420, 422, 424, 426, 428.

In FIG. 4 multiple paths can exist for moving a tape from one linear tape library string to another. For example, a tape can be moved from linear tape library string 402 to linear tape library string 412 in at least the following two ways:

(i) first pass through mechanism 420 is used to move the tape from linear tape library string 402 to linear tape library string 410, and then pass through mechanism 428 is used to move the tape from linear tape library string 410 to linear tape library string 412; and (ii) first pass through mechanism 418 is used to move the tape from linear tape library string 402 to linear tape library string 404, then pass through mechanism 422 is used to move the tape from linear tape library string 404 to linear tape library string 408, then pass through mechanism 424 is used to move the tape from linear tape library string 408 to linear tape library string 410, then pass through mechanism 428 is used to move the tape from linear tape library string 410 to linear tape library string 412.

It can be seen that multiple paths may be used for moving tapes. Certain embodiments therefore allow not only for flexible floor space planning for accommodating linear tape library strings, but also allow for adjustment of transfer speed of tapes via the number of pass-through mechanisms. Furthermore, different algorithms may be used to calculate the shortest possible path to transfer tape cartridges among linear tape library strings.

In certain embodiments, a sum of lengths of first linear tape library string and the second linear tape library string is such that a single linear tape library string whose length is at least equal to the sum cannot be accommodated in a room in which the first and the second linear tape library strings are placed. Thus a very long tape library string is avoided by splitting up the tape library into multiple linear tape library strings.

Figure 5:
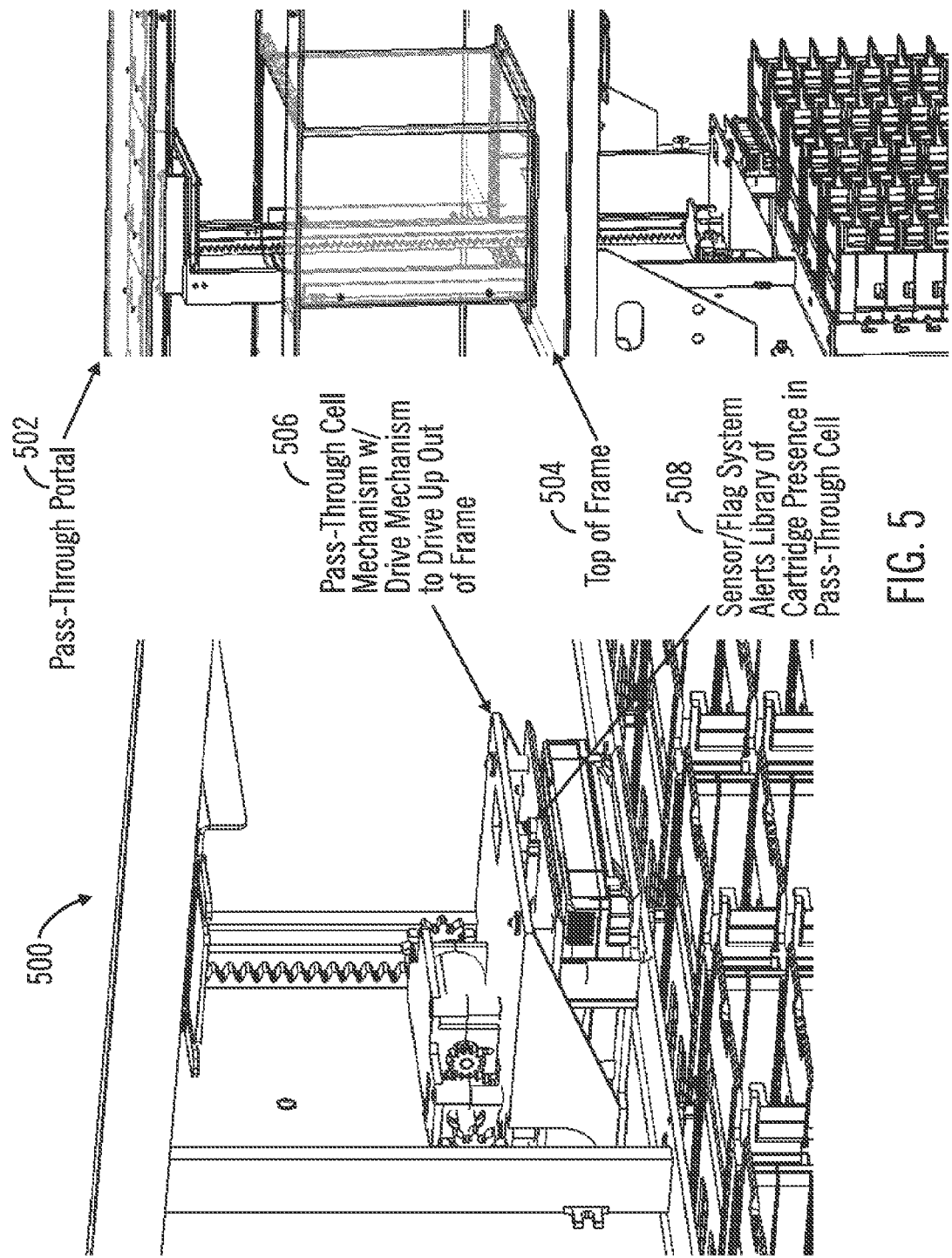
FIG. 5 illustrates a diagram that shows certain first exemplary components of the pass-through mechanism, in accordance with certain embodiments.

FIG. 5 illustrates a diagram 500 that shows certain first exemplary components of the pass-through mechanism, in accordance with certain embodiments. In FIG. 5, a pass through portal 502 (also referred to as a pass through mechanism), is shown with the top of a tape library frame being indicated by reference numeral 504. A pass-through cell mechanism 506 with the drive mechanism to drive up out of a frame is also shown, wherein a sensor/flag system 508 may alert a linear tape library string of the presence of a cartridge in the pass through cell.

Figure 6:
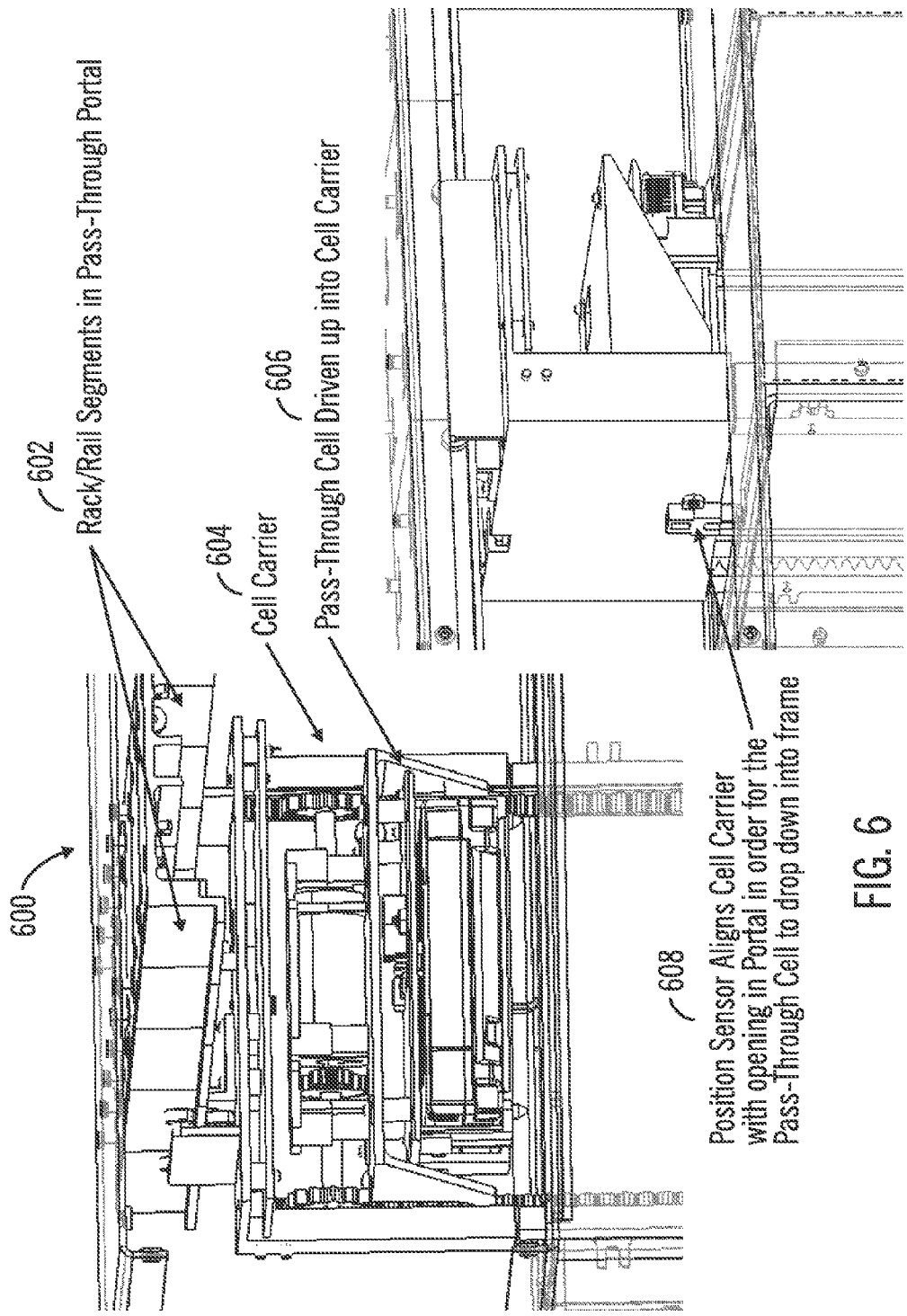
FIG. 6 illustrates a diagram that shows certain second exemplary components of the pass-through mechanism, in accordance with certain embodiments.

FIG. 6 illustrates a diagram 600 that shows certain second exemplary components of the pass-through mechanism, in accordance with certain embodiments. In FIG. 6, rack/rail segments 602 in an exemplary pass-through portal (also referred to as a pass-through mechanism) are shown. Illustrated are a cell carrier 604 and a pass-through cell 606 driven up into the cell carrier. A position sensor 608 that aligns the cell carrier 604 with the opening in a pass through mechanism in order for the pass-through cell to drop down into frame is also shown.

Figure 7:
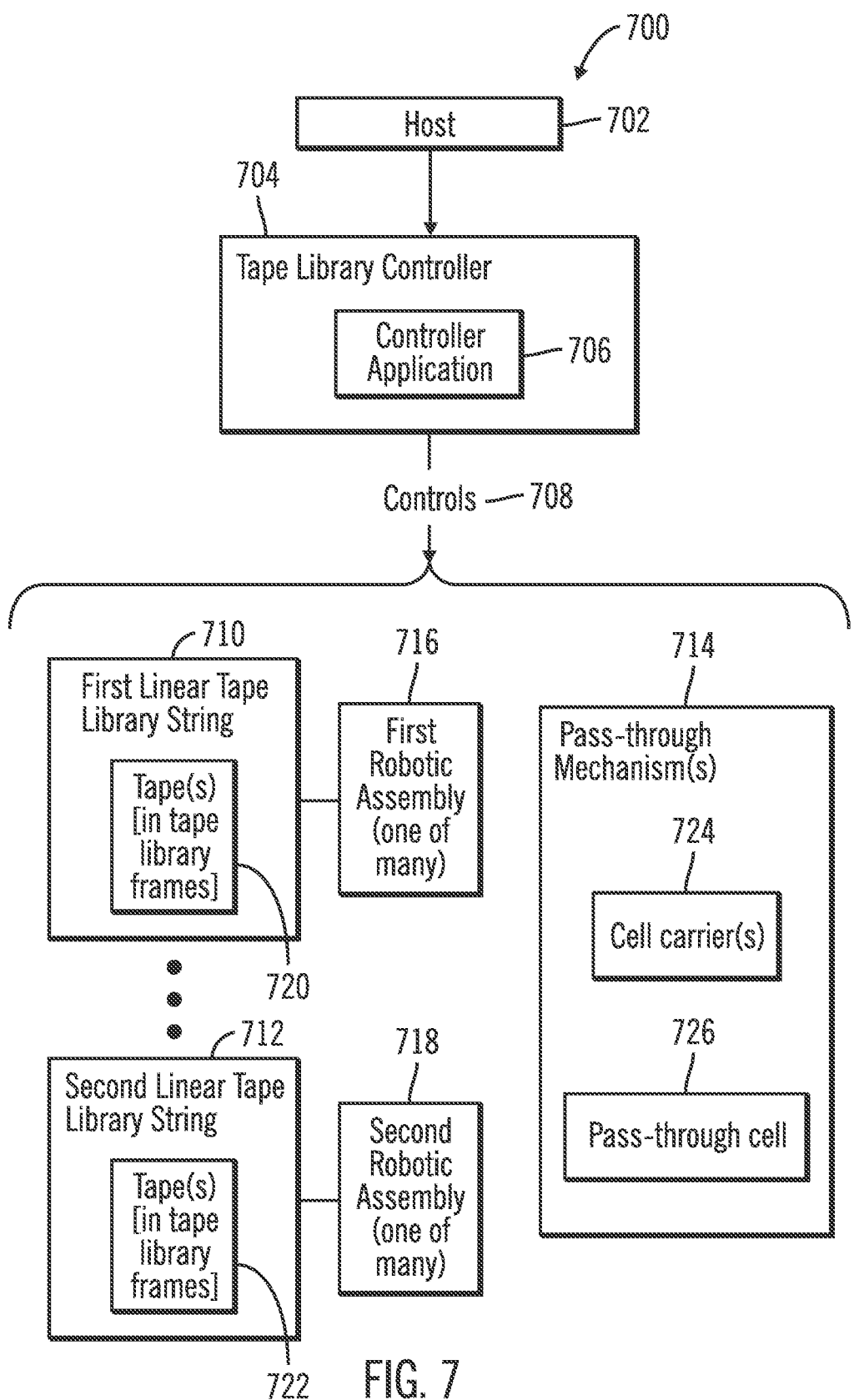
FIG. 7 illustrates a computing environment for controlling a pass-through mechanism that operates in association with a plurality of linear tape library strings, in accordance with certain embodiments.

FIG. 7 illustrates a computing environment 700 for controlling a pass-through mechanism that operates in association with a plurality of linear tape library strings, in accordance with certain embodiments.

A host 702 sends commands to a tape library controller 704 for accessing data maintained in a tape library comprising a plurality of linear tape library strings of which a first linear tape library string 710 and a second linear tape library string 712 are shown.

The tape library controller 704 includes a controller application 706 that controls 708 the first linear tape library string 710, the second linear tape library string 712 and the pass-through mechanism 714 that couples the first linear tape library string 710 and the second linear tape library string 712. Associated with the first linear tape library string 710 is at least one first robotic assembly 716 and associated with the second linear tape library string 712 is at least one second robotic assembly 718. Tapes 720, 722 in tape library frames are stored in the linear tape library strings 710, 712. A cell carrier 724 and a pass-through cell 726 which is a tape cartridge receptacle are included in the pass-through mechanism 714.

Figure 8:
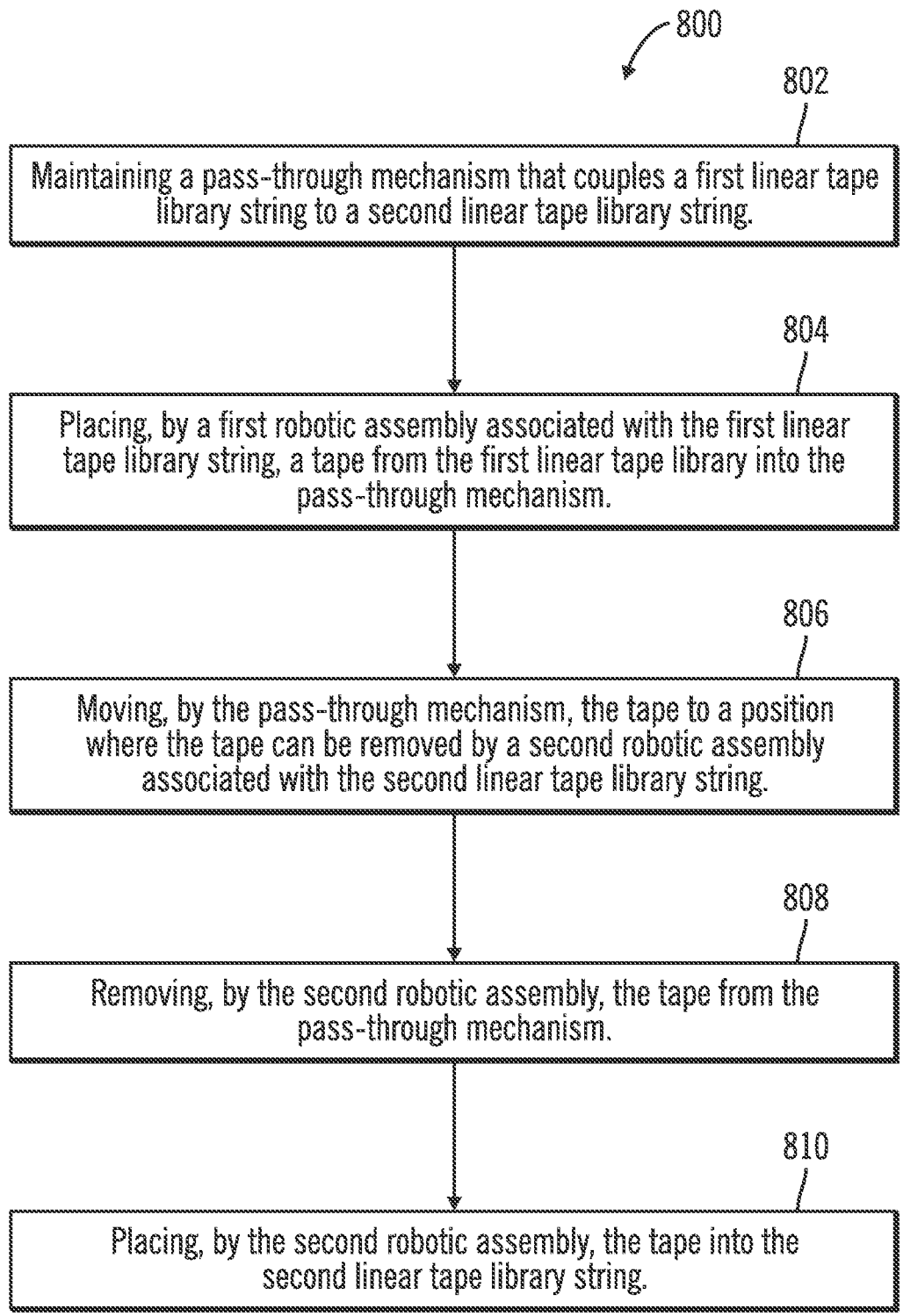
FIG. 8 illustrates exemplary operations implemented within the linear tape libraries and the pass-through mechanism, in accordance with certain embodiments.

FIG. 8 illustrates exemplary operations 800 implemented within the linear tape libraries and the pass-through mechanism, in accordance with certain embodiments.

Control starts at block 802 in which a pass-through mechanism 714 that couples a first linear tape library string 710 to a second linear tape library string 712 is maintained. A first robotic assembly 716 associated with the first linear tape library string 710 places (at block 804) a tape from the first linear tape library string 710 into the pass-through mechanism 714. The pass-through mechanism 714 moves (at block 806) the tape to a position where the tape can be removed by a second robotic assembly 718 associated with the second linear tape library string 712. The second robotic assembly removes (at block 808) the tape from the pass-through mechanism 714 and places (at block 810) the tape into the second linear tape library string 712.

Therefore, in certain embodiments multiple linear tape library strings are coupled to each other via pass-through mechanisms. Pass-through mechanisms allow any tape cartridge from any linear tape library string to pass to a different linear tape library string.

Although certain embodiments have been described with reference to a tape single cartridge that is placed in the pass-through mechanism, embodiments are not limited to a single tape cartridge but may also include a plurality of tape cartridges. Furthermore, although the figures show a single rail and mechanism per pass-through mechanism, multiple rack rail systems with multiple mechanisms could be used in a larger pass-through mechanism.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
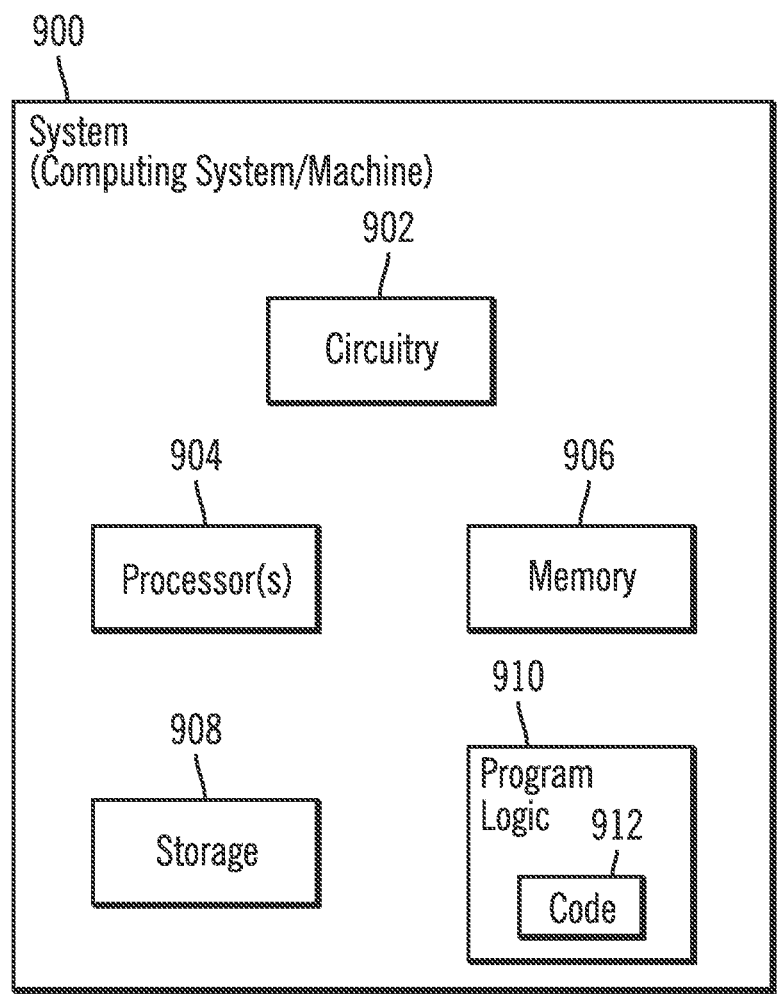
FIG. 9 illustrates the architecture of computing system, wherein in certain embodiments elements of the computing environment of FIG. 7 may be implemented in accordance with the architecture of the computing system.

FIG. 9 illustrates an exemplary computer system 900, wherein in certain embodiments the tape library controller 704 of FIG. 7 may be implemented in accordance with the computer architecture of the computer system 900. The computer system 900 may also be referred to as a system, and may include a circuitry 902 that may in certain embodiments include a processor 904. The system 900 may also include a memory 906 (e.g., a volatile memory device), and storage 908. Certain elements of the system 900 may or may not be found in the tape library controller 704 of FIG. 7. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:
1. A method, comprising:
maintaining a pass-through mechanism; and
placing, by a first robotic assembly a tape from a first linear tape library string into the pass-through mechanism, wherein a sum of lengths of the first linear tape library string and a second linear tape library string is such that a single linear tape library string whose length is at least equal to the sum cannot be accommodated in a room in which the first and the second linear tape library strings are placed.

2. The method of claim 1, wherein the pass-through mechanism couples the first linear tape library string to the second linear tape library string.

3. The method of claim 1, wherein the first and the second tape library strings are included in a plurality of linear tape library strings that are coupled by a plurality of pass-through mechanisms.

4. The method of claim 1, wherein a selected tape can be moved from one linear tape library string to another over a plurality of paths by using one or more of a plurality of pass-through mechanisms.

5. The method of claim 1, wherein the pass-through mechanism is a first pass-through mechanism that is used to move the tape from the first linear tape library string to the second linear tape library string, and wherein a second pass-through mechanism is used to move the tape from the second linear tape library string to a third linear tape library string.

6. The method of claim 1, wherein the pass-through mechanism includes a cell carrier for moving the tape over one or more rail segments.

7. A system, comprising:
a first linear tape library string and a second linear tape library string;
a pass through mechanism;
a first robotic assembly;
a memory; and
a processor coupled to the memory, wherein the processor executes operations to place by the first robotic assembly a tape from the first linear tape library string into the pass-through mechanism, and wherein a sum of lengths of the first linear tape library string and the second linear tape library string is such that a single linear tape library string whose length is at least equal to the sum cannot be accommodated in a room in which the first and the second linear tape library strings are placed.

8. The system of claim 7, wherein the pass-through mechanism couples the first linear tape library string to the second linear tape library string.

9. The system of claim 7, wherein the first and the second tape library strings are included in a plurality of linear tape library strings that are coupled by a plurality of pass-through mechanisms.

10. The system of claim 7, wherein a selected tape can be moved from one linear tape library string to another over a plurality of paths by using one or more of a plurality of pass-through mechanisms.

11. The system of claim 7, wherein the pass-through mechanism is a first pass-through mechanism that is used to move the tape from the first linear tape library string to the second linear tape library string, and wherein a second pass-through mechanism is used to move the tape from the second linear tape library string to a third linear tape library string.

12. The system of claim 7, wherein the pass-through mechanism includes a cell carrier for moving the tape over one or more rail segments.

13. An article of manufacture including code, wherein the code when executed by a processor performs operations, the operations comprising:
maintaining a pass-through mechanism; and
placing, by a first robotic assembly a tape from a first linear tape library string into the pass-through mechanism, wherein a sum of lengths of the first linear tape library string and a second linear tape library string is such that a single linear tape library string whose length is at least equal to the sum cannot be accommodated in a room in which the first and the second linear tape library strings are placed.

14. The article of manufacture of claim 13, wherein the pass-through mechanism couples the first linear tape library string to the second linear tape library string.

15. The article of manufacture of claim 13, wherein the first and the second tape library strings are included in a plurality of linear tape library strings that are coupled by a plurality of pass-through mechanisms.

16. The article of manufacture of claim 13, wherein a selected tape can be moved from one linear tape library string to another over a plurality of paths by using one or more of a plurality of pass-through mechanisms.

17. The article of manufacture of claim 13, wherein the pass-through mechanism is a first pass-through mechanism that is used to move the tape from the first linear tape library string to the second linear tape library string, and wherein a second pass-through mechanism is used to move the tape from the second linear tape library string to a third linear tape library string.

18. The article of manufacture of claim 13, wherein the pass-through mechanism includes a cell carrier for moving the tape over one or more rail segments.

19. A system, comprising:
a memory; and
a processor coupled to the memory, wherein the processor performs operations, the operations comprising:
maintaining a pass-through mechanism; and
placing, by a first robotic assembly a tape from a first linear tape library string into the pass-through mechanism, wherein a sum of lengths of the first linear tape library string and a second linear tape library string is such that a single linear tape library string whose length is at least equal to the sum cannot be accommodated in a room in which the first and the second linear tape library strings are placed.

20. The system of claim 19, wherein the pass-through mechanism couples the first linear tape library string to the second linear tape library string.

* * * * *